US010967992B2

(12) United States Patent
Fuller et al.

(10) Patent No.: US 10,967,992 B2
(45) Date of Patent: Apr. 6, 2021

(54) SYSTEMS AND METHODS FOR TEMPERATURE CONTROL

(71) Applicant: The Boeing Company, Chicago, IL (US)

(72) Inventors: Michael James Fuller, Cocoa Beach, FL (US); Daniel J. Leonard, Seabrook, TX (US); John B. Lauger, Webster, TX (US); Brian R. Dunaway, League City, TX (US); John Charles Gray, Merritt Island, FL (US)

(73) Assignee: THE BOEING COMPANY, Chicago, IL (US)

( * ) Notice: Subject to any disclaimer, the term of this patent is extended or adjusted under 35 U.S.C. 154(b) by 737 days.

(21) Appl. No.: 15/654,569

(22) Filed: Jul. 19, 2017

(65) Prior Publication Data

US 2019/0023427 A1 Jan. 24, 2019

(51) Int. Cl.
| | |
|---|---|
| *B64G 1/50* | (2006.01) |
| *F25B 25/00* | (2006.01) |
| *B64G 1/64* | (2006.01) |
| *B64G 1/56* | (2006.01) |
| *B64G 1/58* | (2006.01) |
| *F25D 3/12* | (2006.01) |
| *F25D 17/00* | (2006.01) |

(52) U.S. Cl.
CPC .............. *B64G 1/50* (2013.01); *B64G 1/56* (2013.01); *B64G 1/58* (2013.01); *B64G 1/64* (2013.01); *F25B 25/005* (2013.01); *F25D 3/12* (2013.01); *F25D 17/00* (2013.01)

(58) Field of Classification Search
CPC ... B64G 1/50; B64G 1/64; B64G 1/56; B64G 1/58; B64G 1/46; B64G 1/60; F25B 25/005; F25D 3/12; F25D 17/00
See application file for complete search history.

(56) References Cited

U.S. PATENT DOCUMENTS

| | | | | |
|---|---|---|---|---|
| 3,613,775 A | * | 10/1971 | Curtis | ........................ B64G 1/50 165/46 |
| 2003/0037819 A1 | * | 2/2003 | Mueller | .................... B64G 5/00 137/386 |
| 2013/0180691 A1 | * | 7/2013 | Jost | .......................... F02K 1/822 165/135 |
| 2014/0260186 A1 | * | 9/2014 | Bahn | .......................... F02K 9/42 60/257 |
| 2016/0152353 A1 | * | 6/2016 | Kusaba | ..................... B64G 1/58 220/562 |

(Continued)

OTHER PUBLICATIONS

Ryan A. Stephan, "Overview of Altair's Thermal Control System and the Associated Technology Development Efforts" (Year: 2010).*

(Continued)

*Primary Examiner* — Assres H Woldemaryam
(74) *Attorney, Agent, or Firm* — Parsons Behle & Latimer

(57) ABSTRACT

A temperature control system may include a heat exchanger configured to cool air within a pressurized enclosed crew cabin when the air is circulated across the heat exchanger and coolant is circulated through the heat exchanger. The system may further include a sublimator configured to cool the coolant. The system may also include a primary coolant line configured to transport the coolant from the sublimator through the heat exchanger.

20 Claims, 4 Drawing Sheets

(56) References Cited

U.S. PATENT DOCUMENTS

2016/0341498 A1* 11/2016 Lynn ..................... F04D 25/088
2017/0351999 A1* 12/2017 Winkle .............. B65D 81/3895

OTHER PUBLICATIONS

Kolbe et al. "Survey of Insulation Used in Nuclear Power Plants and Potential for Debris Generation" (Year: 1981).*
IEEE for "Overview of Altair's Thermal Control System and the Associated Technology Development Efforts" date, 2010.*

* cited by examiner ns and methods for temperature control, and in particular to a temperature control sub-system of a spacecraft environmental controls and life support system.

SYSTEMS AND METHODS FOR TEMPERATURE CONTROL

GOVERNMENT LICENSE RIGHTS

This invention was made with Government support under NNk14MA75C CCtCap Contract awarded by NASA. The government has certain rights in this invention

FIELD OF THE DISCLOSURE

This disclosure relates generally to temperature control, and in particular to a temperature control sub-system of a spacecraft environmental controls and life support system.

BACKGROUND

Advances are continually being made in the area of manned space flight. This area of exploration will certainly play an important role in the progress of science over the next several decades and centuries. As the reaches of manned space flight expand, new technologies are needed protect those who venture into the harsh vacuum of space while also economizing resources to enable longer missions and lower costs associated with space travel. With these goals in mind, improvements may be made to current systems and methods for spacecraft environmental controls and life support.

One aspect of environmental control and life support is temperature control. Objects in orbit are subjected to both the freezing vacuum of space and the scorching heat of the sun. As such, without active temperature control, the environment within a spacecraft could quickly alternate from freezing to boiling. Typical, manned spacecraft rely on coolant that is circulated through radiators and a heat exchanger to cool the crew cabin. However, this method of cooling may not be practical during launch and reentry because radiators may not be accessible during those phases of flight. Further, in many cases, cooling with radiators may be inefficient and results in excess power consumption. Also, options for controlling, or fine tuning, the temperature by crewmembers within the cabin may be limited in typical temperature control systems. Additional disadvantages of temperature control may exist.

SUMMARY

Disclosed is a temperature control system that mitigates or resolves at least one of the disadvantages described above. In an embodiment, a temperature control system includes a sublimator used to cool air within a pressurized crew cabin. The sublimator may act as an active heat sink for cooling. The system may also include outer mold line radiators to eliminate the need to protect the radiators during ascent. The radiators may be used as another option for cooling the crew cabin. The system may also include a ground-based heat exchanger that cools the crew cabin by receiving coolant from a ground-based connection, thereby reducing an amount of coolant onboard a spacecraft during launch.

In an embodiment, a temperature control system includes a heat exchanger configured to cool air within a pressurized enclosed crew cabin when the air is circulated across the heat exchanger and coolant is circulated through the heat exchanger. The system further includes a sublimator configured to cool the coolant. The system also includes a primary coolant line configured to transport the coolant from the sublimator through the heat exchanger.

In some embodiments, the system includes at least one radiator configured to cool the coolant, where the sublimator is configured to cool the coolant during a first stage of flight, and where the at least one radiator is configured to cool the coolant during a second stage of flight. In some embodiments, the sublimator is positioned along the coolant line downstream from the heat exchanger and upstream from the at least one radiator. In some embodiments, the system includes a radiator bypass valve to alter an amount of coolant circulated through at least one radiator and thereby control a temperature of the coolant passing through the heat exchanger. In some embodiments, the heat exchanger is located in a service module, where the pressurized enclosed crew cabin is located in a crew module, where the service module is separable from the crew module, and where the system further includes a first leakage prevention valve and a second leakage prevention valve coupled to the primary coolant line and configured to prevent coolant leakage when the service module is separated from the crew module. In some embodiments, the at least one radiator is an outer mold line radiator positioned along an exterior of a service module and provides the service module with micrometeoroid and orbital debris protection, aero-thermal heating protection, acoustic protection, pressure load protection, or any combination thereof. In some embodiments, the at least one radiator is thermally isolated from a service module by a vacuum during flight.

In some embodiments, the system includes a ground-based heat exchanger configured to cool the coolant while the enclosed crew cabin is not in flight. In some embodiments, the ground-based heat exchanger cools the coolant by receiving flow of another coolant through the ground-based heat exchanger from a ground-based connection to a ground-based coolant line. In some embodiments, the ground-based heat exchanger is located within an annulus adjacent to the pressurized enclosed crew cabin. In some embodiments, the system includes a heat exchanger bypass valve to bypass at least a portion of the coolant from passing through the heat exchanger and thereby enabling control of a temperature within the enclosed crew cabin.

In some embodiments, the system includes a secondary coolant line configured to transport coolant from the sublimator through the heat exchanger. In some embodiments, the system includes at least three coolant pumps, where two of the at least three coolant pumps are configured to circulate coolant through the primary coolant line, and where one of the at least three coolant pumps is configured to circulate coolant through the secondary coolant line, and where each of the at least three coolant pumps are powered by separate power sources. In some embodiments, the coolant is non-toxic. In some embodiments, the system includes a fill port to provide access to the sublimator during flight for filling the sublimator with water. In some embodiments, the coolant line is insulated with a moisture absorbent foam.

In an embodiment, a method for temperature control includes circulating coolant through a sublimator to cool the coolant. The method further includes transporting the coolant from the sublimator to a heat exchanger through a primary coolant line. The method also includes cooling air within a pressurized enclosed crew cabin by circulating air across the heat exchanger while circulating the coolant through the heat exchanger.

In some embodiments, the method includes circulating the coolant through at least one radiator to cool the coolant. In some embodiments, the method includes directing a portion of the coolant to bypass the heat exchanger and thereby enable control of a temperature within the enclosed crew cabin.

In an embodiment, a method for temperature control includes cooling air within a pressurized enclosed crew cabin by circulating the air across a heat exchanger while circulating coolant through the heat exchanger. The method further includes, while the pressurized enclosed crew cabin is not in flight, circulating the coolant through a ground-based heat exchanger, where the ground-based heat exchanger cools the coolant by receiving flow of another coolant from a ground-based connection to a ground-based coolant line. The method also includes, during a first stage of flight, circulating the coolant through a sublimator to cool the coolant. The method includes, during a second stage of flight, circulating the coolant through at least one radiator to cool the coolant.

Figure 1:
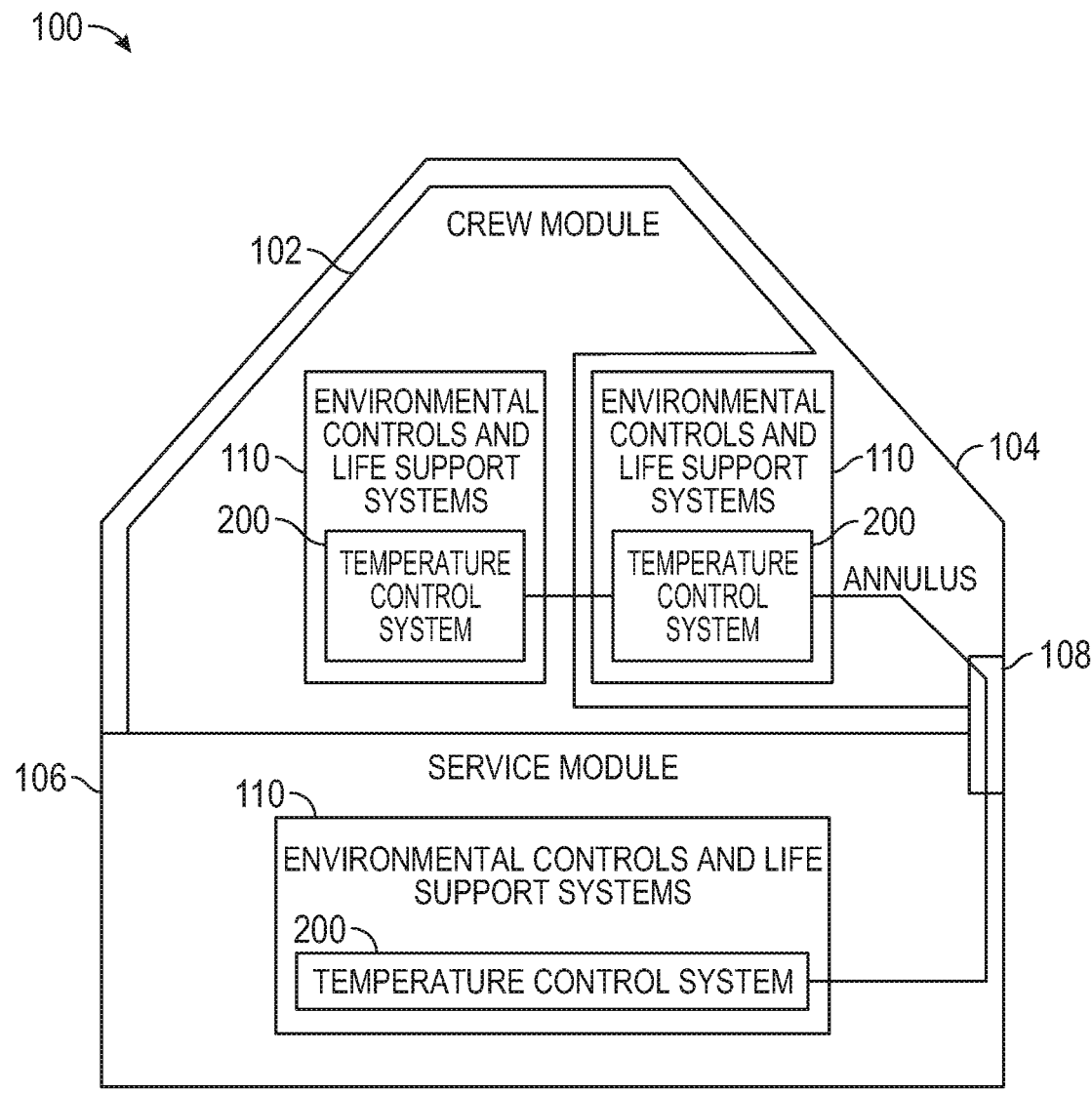
FIG. 1 is a diagram depicting an embodiment of a spacecraft that includes environmental controls and life support systems.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents, and alternatives falling within the spirit and scope of the disclosure.

DETAILED DESCRIPTION

Referring to FIG. 1, an embodiment of a spacecraft 100 is depicted. The spacecraft 100 may include a crew module 102 having an annulus 104. The spacecraft 100 may further include a detachable service module 106. An umbilical 108 may provide a link between systems within the crew module 102 and the service module 106.

The spacecraft 100 may include environmental controls and life support systems 110. Further, as part of the environmental controls and life support systems 110, the spacecraft 100 may include a temperature control system 200. Portions of the environmental controls and life support systems 110 and temperature control system 200 may be located within the crew module 102, the annulus 104, and the service module 106. While the service module 106 is attached to the crew module 102, the umbilical 108 may provide links between portions of the temperature control system 200 within the annulus 104 and portions of the temperature control system 200 within the service module 106. Embodiments, of the temperature control system 200 are described further herein.

Figure 2:
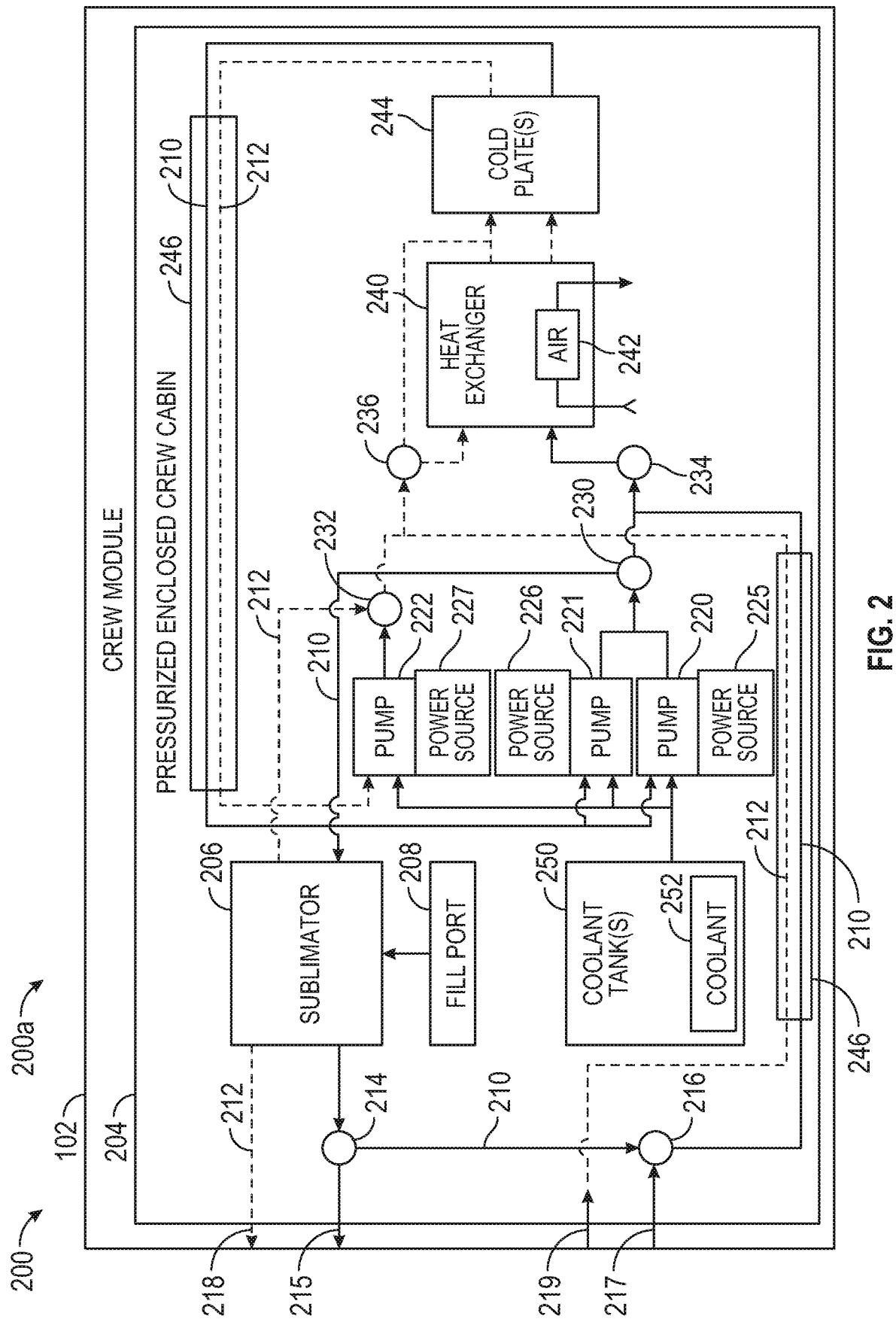
FIG. 2 is a block diagram depicting a portion of an embodiment of a temperature control system within a crew module.

Referring to FIG. 2, a portion 200a of an embodiment of a temperature control system 200 within a crew module 102 is depicted. The portion 200a may further be located within a pressurized enclosed crew cabin 204 of the crew module 102. In some embodiments, the portion 200a may be located within an avionics bay (not shown) of the pressurized enclosed crew cabin 204.

The portion 200a of the system 200 may include a sublimator 206, a heat exchanger 240, and at least one cold plate 244. A primary coolant line 210 and a secondary coolant line 212 may transport a coolant 252 through the sublimator 206, the heat exchanger 240, and the at least one cold plate 244 as described herein. For clarity, the primary coolant line 210 is depicted as a solid line while the secondary coolant line 212 is depicted as a dashed line.

The sublimator 206 may be any sublimator device capable of using a sublimation process to cool the coolant 252. In general, a sublimator works by, first, receiving liquid water. Then, a portion of the water is frozen, typically due to being exposed to a vacuum environment. The frozen water sublimates, passing from a solid phase to a gas phase, resulting in a net energy loss. The water vapor may then be expelled from the sublimator. The coolant 252 may be circulated through the sublimator 206. As the coolant 252 circulates, the energy is removed from the coolant 252 causing its temperature to drop. The sublimator 206 may include a fill port 208 giving a crew within the pressurized crew cabin 204 access to add water to the sublimator 206. Other mechanisms to add water to the sublimator 206 may also exist.

The heat exchanger 240 may be any heat exchanger device capable of circulating the coolant 252 therethrough, and using the coolant 252 to cool air 242. In general, a heat exchanger works by circulating the coolant 252 through a thin fin grating (not shown) while passing air 242 through the grating at the same time. The fins act as a heat sink, drawing heat from the air 242 and transferring the heat to the coolant 252. Other types of heat exchangers may also exist and may be usable with the system 200. The heat exchanger 240 may be configured to cool air within the pressurized enclosed crew cabin 204 when the air 242 is circulated across the heat exchanger 240 and the coolant 252 is circulated therethrough.

The primary coolant line 210 may circulate the coolant 252 through the sublimator 206 and may transport the coolant 252 from the sublimator 206 to the heat exchanger 240. The primary coolant line 210 may also transport the coolant 252 to the other elements of the system 200. In the interest of having backup systems in the event of a failure, the secondary coolant line 212 may also circulate the coolant 252 through the sublimator 206 and the heat exchanger 240 and may also transport the coolant 252 to the other elements of the system 200.

The primary coolant line 210 and the secondary coolant line 212 may be insulated using a moisture absorbent foam 246. As environmental changes occur adjacent to the coolant lines 210, 212, a dew point of the surrounding environment may also change. The moisture absorbent foam 246 may enable a lower volume of insulation to be used. Rather than preventing condensation from occurring, the moisture absorbent foam may retain the condensation until environmental conditions change, causing the moisture to evaporate. A suitable insulation system is described with reference to U.S. patent application Ser. No. 15/189,613, filed on Jun. 22, 2016 and entitled "Condensation-Controlling Insulation System and Method," the contents of which are hereby incorporated in their entirety.

A first valve 214 may be positioned downstream from the sublimator 206 along the primary coolant line 210. In a first state, the first valve 214 may transport the coolant 252 to the annulus 104 (depicted in FIG. 3) of the crew module 102 as indicated by arrow 215. The coolant 252 may be further cooled within the annulus 104 and within the service module 106, as described herein, before being transported to a second valve 216 as indicated by arrow 217 and eventually to the heat exchanger 240. In a second state, the first valve 214 may transport the coolant 252, or a portion thereof, along a more direct branch of the primary coolant line 210 to the second valve 216, bypassing the annulus 104 and the service module 106. At the second valve 216, any of the coolant 252 that was sent through the annulus 104 and the service module 106 may be recombined with the coolant 252 that passed directly from the first valve 214. The coolant 252 may then be transported toward the heat exchanger 240.

As shown by the arrows 218, 219, the secondary coolant line 212 may be configured to pass through the annulus 104 and the service module 106 for cooling as described herein. FIG. 2 depicts the second coolant line 212 as omitting valves for bypassing the annulus 104 and the service module 106. This is because, in the example embodiment depicted, the secondary coolant line 212 is considered to be a backup coolant line and need not include the same complexity as the primary coolant line 210. Although not depicted, in some embodiment, the secondary coolant line 212 may also include valves for bypassing the annulus 104 and the service module 106. The secondary coolant line 212 eventually transports the coolant 252 toward the heat exchanger 240.

In order to generate coolant flow through the primary coolant line 210, a first pump 220 and a second pump 221 may be coupled thereto. The first pump 220 may be powered by a first power source 225 and the second pump 221 may be powered by a second power source 226. By being powered by separate power sources, the first pump 220 and the second pump 221 may be operable independently with either pump functioning as a backup for the other. The secondary coolant line may also include a pump 222 coupled thereto. The pump 222 may include a power source 227 distinct from the power sources 225, 226. Although FIG. 2 depicts three pumps 220-222, in other embodiments, the portion 200a of the system 200 may include more or fewer than three pumps and more or fewer than three power sources.

At least one coolant tank 250 may provide the coolant 252 to the pumps 220-222. The at least one coolant tank 250 may replenish coolant within the primary coolant line 210 and the secondary coolant line 212. For example, as the system 200 passes through various phases of flight, a coolant capacity of the system 200 may change. The at least one coolant tank 250 may provide additional coolant to the primary coolant line 210 and the secondary coolant line 212 when additional coolant is needed. Likewise, the at least one coolant tank 250 may store coolant when less coolant is needed within the primary coolant line 210 and the secondary coolant line 212. Because the portion 200a of the system 200 is within the pressurized enclosed crew cabin 204 in close proximity to a crew, the coolant 252 used by the system 200 may be non-toxic in order to avoid injury to the crew in the case of a leak.

After passing through the pumps 220, 221, the coolant 252 within the primary coolant line 210 may be transported to a radiator bypass valve 230. In a first state, the radiator bypass valve 230 may direct the coolant 252 to the sublimator 206 to be cooled. In another state, the radiator bypass valve 230 may direct the coolant 252, or a portion thereof, toward the heat exchanger 240 without being cooled. The portion of the coolant 252 that is not cooled may then be mixed with a portion of the coolant 252, received from the valve 216, which has been cooled. By directing a portion of the coolant 252 directly toward the heat exchanger 240 instead of first cooling the portion of the coolant 252, the overall temperature of the coolant 252 within the primary coolant line 210 may be controlled by the valve 230.

Likewise, the secondary coolant line 212 may include a radiator bypass valve 232. In a first state, the radiator bypass valve 232 directs the coolant 252 within the secondary coolant line 212 to the sublimator 206. In a second state, the radiator bypass valve 232 directs the coolant 252, or a portion thereof, toward the heat exchanger 240 without being cooled. As such, the temperature of the coolant 252 within the secondary coolant line 212 may be controlled. The state of the radiator bypass valves 230, 232 may be controlled based on feedback sensors (not shown). Additionally or alternatively, the state of the radiator bypass valves 230, 232 may be manually controlled by a crew within the pressurized enclosed crew cabin 204.

As another mechanism for controlling a cabin temperature, the system 200 may include a heat exchanger bypass valve 234 coupled to the primary coolant line 210 and a heat exchanger bypass valve 236 coupled to the secondary coolant line 212. In first states, the heat exchanger bypass valves 234, 236 may direct the coolant 252 into the heat exchanger 240. In second states, the heat exchanger bypass valves 234, 236 may direct the coolant 252, or a portion thereof, into other branches of the primary coolant line 210 or secondary coolant line 212 that bypass the heat exchanger 240.

After passing through the heat exchanger 240, the coolant 252 within the primary coolant line 210 and within the secondary coolant line 212 may pass through at least one cold plate 244. The at least one cold plate 244 may be used to cool equipment and control panels to prevent overheating. After passing through the at least one cold plate 244, the coolant 252 may be transported back to the pumps 220-222, and from the pumps 220-222 back to the sublimator 206 in a cycle.

Figure 3:
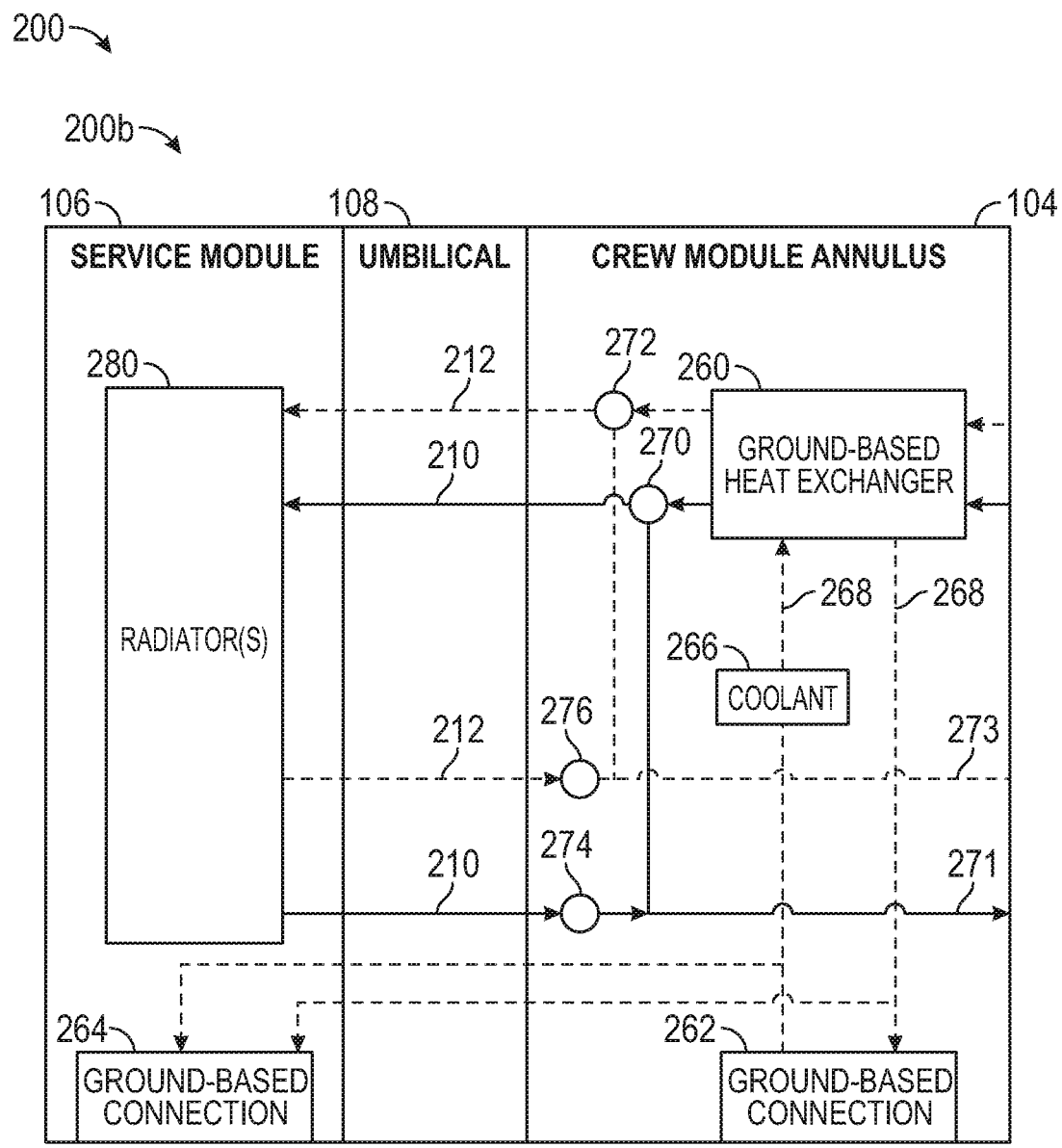
FIG. 3 is a block diagram depicting a portion of an embodiment of a temperature control system within an annulus of a crew module, an umbilical, and a service module.

Referring to FIG. 3, a portion 200b of an embodiment of a temperature control system 200 within an annulus 104 of a crew module 102, an umbilical 108, and a service module 106 is depicted. As explained above, the coolant 252 (labeled in FIG. 2) may be circulated through the annulus 104, the umbilical 108, and the service module 106 via the primary coolant line 210 and the secondary coolant line 212 for additional or alternative cooling of the coolant 252.

The portion 200b of the system 200 may include a ground-based heat exchanger 260 within the annulus 104 for cooling the coolant 252. A ground-based connection 262 may provide another coolant 266 to the ground-based heat exchanger 260 via a ground-based coolant line 268. The ground-based coolant line 268 is represented by a dotted line. The other coolant 266 may first be cooled by mechanisms exterior to the spacecraft 100, when the spacecraft 100 is on the ground, and then used to cool the coolant 252 within the primary coolant line 210 and the secondary coolant line 212. After circulating through the ground-based heat exchanger 260, the other coolant 266 may be passed back out of the spacecraft 100 through the ground-based connection 262 for additional cooling. A second ground-based connection 264 may be located within the service module 106 as an optional method of providing the other coolant 266 to the ground-based heat exchanger 260.

As explained above, different amounts of coolant may be used for different phases of flight. Typically more coolant is used while the spacecraft 100 is on the ground. Using the ground-based heat exchanger 260 along with the other coolant 266 to cool the coolant 252 within the primary coolant line 210 and the secondary coolant line 212 enables less coolant to be located within the spacecraft 100 during launch, thereby decreasing a launch weight of the spacecraft 100. By decreasing the weight of the spacecraft 100, energy and launch resources may be conserved.

After passing through the ground-based heat exchanger 260, the coolant 252 within the primary coolant line 210 may be transported to a leakage prevention valve 270. In a first state, the leakage prevention valve 270 may direct the coolant 252 to the service module 106 via the umbilical 108. In a second state, the leakage prevention valve 270 may direct the coolant 252 back to the crew module 102, as shown by the arrow 271. Whether the coolant 252 is directed toward the service module 106 or toward the crew module 102 may depend on a stage of flight of the spacecraft 100. For example, when the umbilical 108 has been severed and the service module 106 is disconnected from the crew module 102, the leakage prevention valve 270 may direct the coolant 252 to the crew module 102, thereby preventing leakage of the coolant 252 at a severed portion of the primary coolant line 210 within the umbilical 108.

Likewise, the secondary coolant line 212 may include a leakage prevention valve 272. In a first state, the leakage prevention valve 272 directs the coolant 252 to the service module 106 for additional cooling. In a second state, the leakage prevention valve 272 directs the coolant to the crew module 102 as shown by the arrow 273.

The service module 106 may include at least one radiator 280. The at least one radiator 280 may be positioned along the edges on an exterior of the service module 106 and may be exposed to the vacuum of space in order to cool the coolant 252 that circulated therethrough. Unlike prior spacecraft, the at least one radiator 280 may be an outer mold line radiator. As such, the at least one radiator 280 may perform the additional functions of providing the service module 106 with micrometeoroid and orbital debris protection, aerothermal heating protection, acoustic protection, pressure load protection, other types of protective functions, or any combinations thereof. The at least one radiator 280 may further be thermally isolated from the rest of the service module 106 due to the vacuum conditions associated with space travel. The use of outer mold line radiators for cooling may also reduce the need for a separate active radiator deployment operation.

As the coolant 252 returns from the service module 106, it may pass through a leakage prevention valve 274 coupled to the primary coolant line 210 and a leakage prevention valve 276 coupled to the secondary coolant line 212. The leakage prevention valves 274 and 276 may be used to isolate the primary coolant line 210 and the secondary coolant line 276 from severed branches within the umbilical 108 when the service module 106 is detached from the crew module 102. From the leakage prevention valves 274, 276, the coolant may be transported back to the crew module 102 as indicated by the arrows 271, 273.

As described above, the system 200 has three mechanisms for cooling the coolant 252, namely, the sublimator 206, the ground-based heat exchanger 260, and the at least one radiator 280. Each mechanism, or combinations thereof, may be used during different phases of flight. For example, while the spacecraft 100 is on the ground, the coolant 252 may be cooled by the ground-based heat exchanger 260. During a first phase of flight, the sublimator 206 may be relied on to cool the coolant 252. The first phase of flight may be during a launch, approximately two minutes after takeoff. This time allows the spacecraft 100 to gain enough altitude to enable the sublimator 206 to be subjected to vacuum conditions. During a second phase of flight, the at least one radiator 280 may be used to cool the coolant 252. Finally, during reentry, the umbilical 108 may be severed and the service module 106 may be detached. The leakage prevention valves 270, 272, 274, 276 may be set to isolate the branches of the primary coolant line 210 and the secondary coolant line 212 that extend into the umbilical 108. In this case, the sublimator 206, alone, may be used to cool the coolant 252.

In some cases, the sublimator 206 may also be used in combination with the at least one radiator 280. In order to prevent freezing of the coolant at the sublimator 206, the sublimator 206 may positioned downstream from the heat exchanger 240 and upstream from the at least one radiator 280. This position enables the sublimator 206 to receive the coolant 252 after it has been heated in the heat exchanger 240 and before it has been significantly cooled by the at least one radiator 280.

The system 200 includes several benefits and advantages over the prior art. For example, using the sublimator 206 to cool the pressurized enclosed crew cabin 204 during take-off and landing ensures crew comfort while limiting the requirement for other bulky cooling systems during these phases of flight. The system 200 also include enables fine tuning of the temperature of the coolant through the radiator bypass valves 230, 232 and fine tuning of the temperature within the pressurized enclosed crew cabin 204 through the heat exchangers bypass valves 234, 236. The valves 214, 216 and the leakage prevention valves 270, 272, 274, 276, together, provide dual fault tolerance for leakage when the service module 106 is separated from the crew module 102. The ground-based heat exchanger 260 helps reduce a flight load of the spacecraft 100 by using ground resources to cool the pressurized enclosed crew cabin 204 while on the ground. In addition to these advantages, other advantages may exist.

Figure 4:
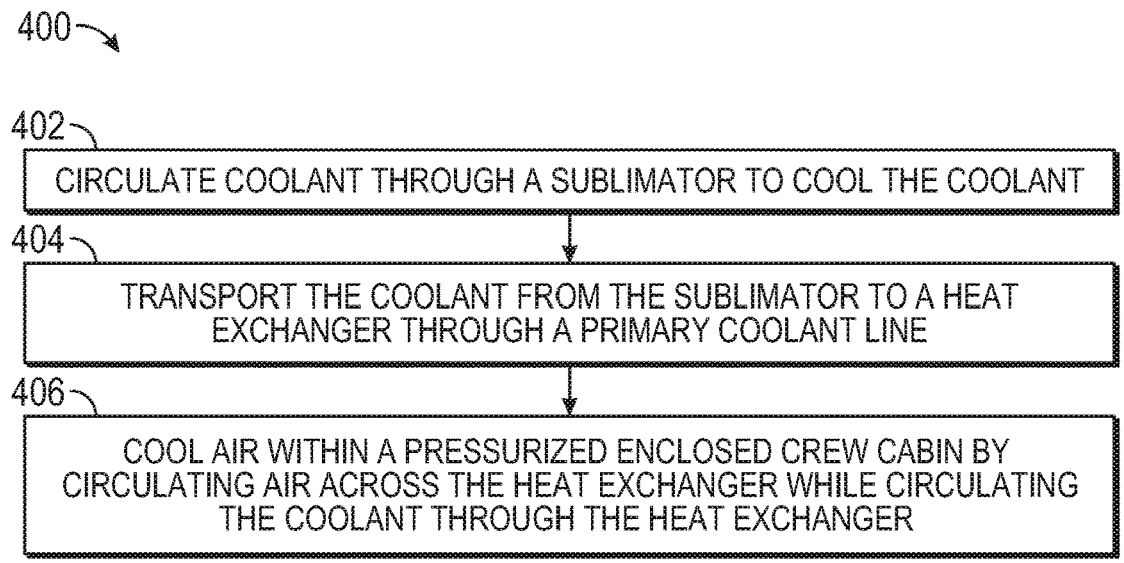
FIG. 4 is a flow chart depicting an embodiment of a method for temperature control.

Referring to FIG. 4, an embodiment of a method 400 for temperature control is depicted. The method 400 may include circulating coolant through a sublimator to cool the coolant, at 402. For example, the coolant 252 may be circulated through the sublimator 206 to cool the coolant 252.

The method 400 may further include transporting the coolant from the sublimator to a heat exchanger through a coolant line, at 404. For example, the coolant 252 may be transported from the sublimator 206 to the heat exchanger 240 within the primary coolant line 210.

The method 400 may also include cooling air within a pressurized enclosed crew cabin by circulating air across the heat exchanger while circulating the coolant through the heat exchanger, at 406. For example, the air 242 within the pressurized enclosed crew cabin 204 may be cooled by circulating the air 242 across the heat exchanger 240 while circulating the coolant 252 through the heat exchanger 240.

A benefit of the method 400 is that by using a sublimator to cool a pressurized crew cabin, instead of typical cooling methods, crew comfort may be maintained while reducing an amount of resources used for cooling. Other advantages may exist.

Figure 5:
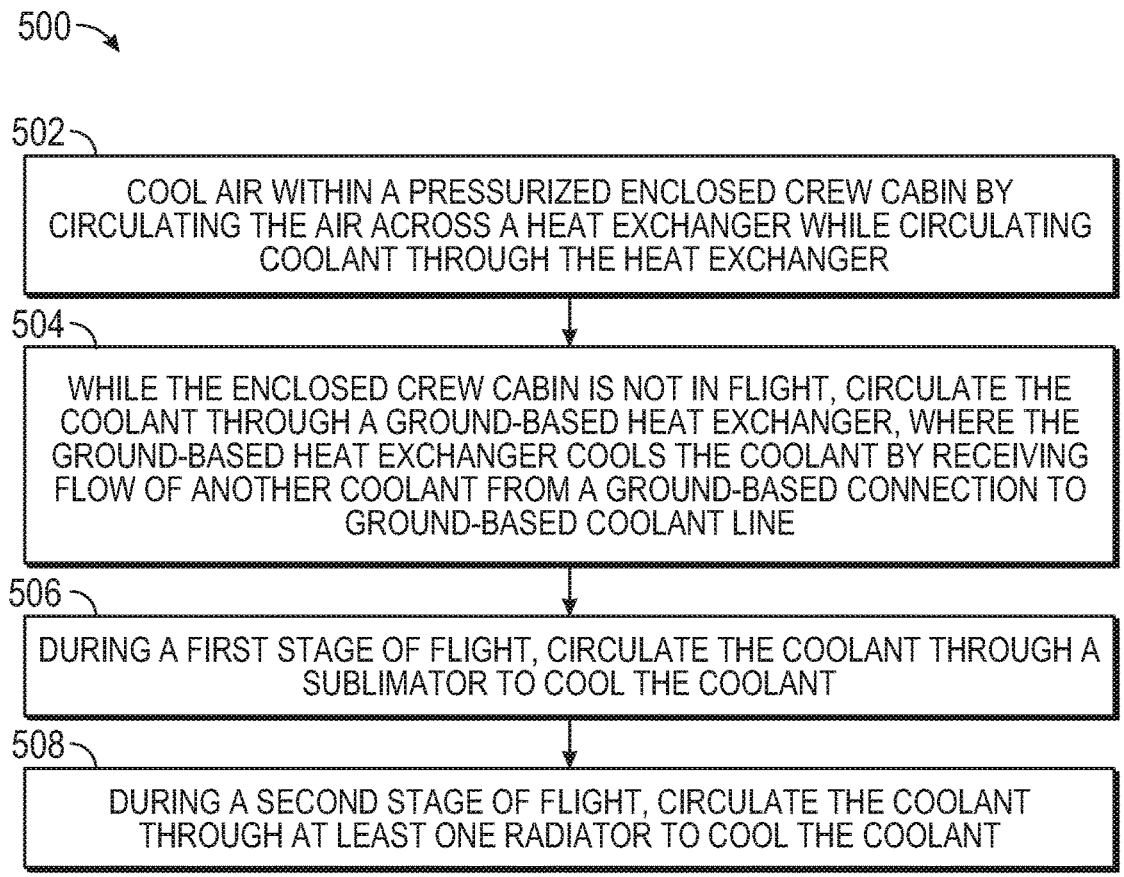
FIG. 5 is a flow chart depicting an embodiment of a method for temperature control.

Referring to FIG. 5, an embodiment of a method 500 for temperature control is depicted. The method 500 may include cooling air within a pressurized enclosed crew cabin by circulating the air across a heat exchanger while circulating coolant through the heat exchanger, at 502. For example, the air 242 within the pressurized enclosed crew cabin 204 may be cooled by circulating the air 242 across the heat exchanger 240 while circulating the coolant 252 through the heat exchanger 240.

The method 500 may further include, while the pressurized enclosed crew cabin is not in flight circulating the coolant through a ground-based heat exchanger, at 504. The ground-based heat exchanger may cool the coolant by receiving flow of another coolant from a ground-based connection to a ground-based coolant line. For example, while the pressurized enclosed crew cabin 204 is not in flight the coolant 252 may be circulated through the ground-based heat exchanger 260. The ground-based heat exchanger 260 may cool the coolant 252 by receiving flow of the other coolant 266 from the ground based-connection 262 to the ground-based coolant line 268.

The method 500 may also include, during a first stage of flight, circulating the coolant through a sublimator to cool the coolant, at 506. For example, during a first stage of flight, the coolant 252 may be circulated through the sublimator 206 to cool the coolant 252.

The method 500 may include, during a second stage of flight, circulating the coolant through at least one radiator to cool the coolant, at 508. For example, during a second state of flight, the coolant 252 may be circulated through the at least one radiator 280 to cool the coolant 252.

A benefit of the method 500 is that by using a sublimator to cool a pressurized crew cabin during stages of flight where radiators may not be usable, e.g., during launch and during reentry, crew comfort may be maintained while reducing an amount of resources used for cooling. Further, by relying on ground-based cooling methods while not in flight, a launch weight of the spacecraft may be reduced. Other advantages may exist.

Although various embodiments have been shown and described, the present disclosure is not so limited and will be understood to include all such modifications and variations as would be apparent to one skilled in the art.

What is claimed is:

1. A temperature control system comprising:
   a heat exchanger that cools air within a pressurized enclosed crew cabin as the air is circulated across the heat exchanger and coolant is circulated through the heat exchanger;
   a sublimator that cools the coolant; and
   a primary coolant line that transports the coolant from the sublimator through the heat exchanger;
   a secondary coolant line configured to transport coolant from the sublimator through the heat exchanger; and
   at least three coolant pumps, wherein two of the at least three coolant pumps are configured to circulate coolant through the primary coolant line, and wherein one of the at least three coolant pumps is configured to circulate coolant through the secondary coolant line, and wherein each of the at least three coolant pumps are powered by separate power sources.

2. The system of claim 1, further comprising:
   at least one radiator configured to cool the coolant, wherein the sublimator is configured to cool the coolant during a first stage of flight, and wherein the at least one radiator is configured to cool the coolant during a second stage of flight.

3. The system of claim 2, wherein the sublimator is positioned along the coolant line downstream from the heat exchanger and upstream from the at least one radiator.

4. The system of claim 2, further comprising a radiator bypass valve to alter an amount of coolant circulated through at least one radiator and thereby control a temperature of the coolant passing through the heat exchanger.

5. The system of claim 2, wherein the heat exchanger is located in a service module, wherein the pressurized enclosed crew cabin is located in a crew module, wherein the service module is separable from the crew module, and wherein the system further comprises a first leakage prevention valve and a second leakage prevention valve coupled to the primary coolant line and configured to prevent coolant leakage when the service module is separated from the crew module.

6. The system of claim 2, wherein the at least one radiator is an outer mold line radiator positioned along an exterior of a service module and provides the service module with micrometeoroid and orbital debris protection, aero-thermal heating protection, acoustic protection, pressure load protection, or any combination thereof.

7. The system of claim 2, wherein the at least one radiator is thermally isolated from a service module by a vacuum during flight.

8. The system of claim 1, further comprising:
   a ground-based heat exchanger configured to cool the coolant while the enclosed crew cabin is not in flight.

9. The system of claim 8, wherein the ground-based heat exchanger cools the coolant by receiving flow of another coolant through the ground-based heat exchanger from a ground-based connection to a ground-based coolant line.

10. The system of claim 8, wherein the ground-based heat exchanger is located within an annulus adjacent to the pressurized enclosed crew cabin.

11. The system of claim 1, further comprising a heat exchanger bypass valve to bypass at least a portion of the coolant from passing through the heat exchanger and thereby enable control of a temperature within the enclosed crew cabin.

12. The system of claim 1, wherein the coolant is non-toxic.

13. The system of claim 1, further comprising a fill port to provide access to the sublimator during flight for filling the sublimator with water.

14. The system of claim 1, wherein the primary coolant line is insulated with a moisture absorbent foam.

15. A method for temperature control comprising:
   providing a temperature control system comprising:
      a heat exchanger that cools air within a pressurized enclosed crew cabin as the air is circulated across the heat exchanger and coolant is circulated through the heat exchanger;
      a sublimator that cools the coolant;
      a primary coolant line that transports the coolant from the sublimator through the heat exchanger;
      a secondary coolant line configured to transport coolant from the sublimator through the heat exchanger; and
      at least three coolant pumps, wherein two of the at least three coolant pumps are configured to circulate coolant through the primary coolant line, and wherein one of the at least three coolant pumps is configured to circulate coolant through the secondary coolant line;
   circulating coolant through the sublimator to cool the coolant;
   transporting the coolant from the sublimator to the heat exchanger through the primary coolant line; and
   cooling air within the pressurized enclosed crew cabin by circulating air across the heat exchanger while circulating the coolant through the heat exchanger.

16. The method of claim 15, further comprising:
   circulating the coolant through at least one radiator to cool the coolant.

17. The method of claim 15, further comprising:
directing a portion of the coolant to bypass the heat exchanger and thereby enable control of a temperature within the enclosed crew cabin.

18. A method for temperature control comprising:
cooling air within a pressurized enclosed crew cabin by circulating the air across a heat exchanger while circulating coolant through the heat exchanger;
while the pressurized enclosed crew cabin is not in flight:
circulating the coolant through a ground-based heat exchanger, wherein the ground-based heat exchanger cools the coolant by receiving flow of another coolant from a ground-based connection to a ground-based coolant line;
during a first stage of flight:
circulating the coolant through a sublimator to cool the coolant; and
during a second stage of flight:
circulating the coolant through at least one radiator to cool the coolant.

19. The method of claim 18, further comprising:
transporting the coolant from the sublimator to the heat exchanger through a primary coolant line using at least a first coolant pump and a second coolant pump; and
transporting the coolant from the sublimator to the heat exchanger through a secondary coolant line using at least a third coolant pump.

20. The method of claim 19, wherein each of the first coolant pump, the second coolant pump, and the third coolant pump are powered by separate power sources.

* * * * *